US006756598B2

(12) United States Patent
Berg et al.

(10) Patent No.: US 6,756,598 B2
(45) Date of Patent: Jun. 29, 2004

(54) UNIT FOR IRRADIATING A WORKPIECE WITH ULTRAVIOLET RADIATION

(75) Inventors: Matthias Berg, Steinheim (DE); Ralf Kupferer, Stuttgart (DE); Martin Ehrath, Goeppingen (DE)

(73) Assignee: Erwin Behr Automotive GmbH, Wendlingen (DE)

( * ) Notice: Subject to any disclaimer, the term of this patent is extended or adjusted under 35 U.S.C. 154(b) by 0 days.

(21) Appl. No.: 10/177,622

(22) Filed: Jun. 19, 2002

(65) Prior Publication Data

US 2003/0041974 A1 Mar. 6, 2003

Related U.S. Application Data

(63) Continuation of application No. PCT/EP00/13085, filed on Dec. 21, 2000.

(30) Foreign Application Priority Data

Dec. 22, 1999 (DE) .......................................... 199 61 991

(51) Int. Cl.[7] ................................................ G01N 23/00

(52) U.S. Cl. ............................. 250/455.11; 250/453.11; 427/510; 427/512

(58) Field of Search ....................... 250/455.11, 453.11, 250/504 R, 492.1; 427/510, 512, 96; 118/322

(56) References Cited

U.S. PATENT DOCUMENTS

| | | | | |
|---|---|---|---|---|
| 2,299,052 A | | 10/1942 | Dexter | |
| 4,839,522 A | * | 6/1989 | Bourgeois et al. | 250/455.11 |
| 5,167,756 A | | 12/1992 | Lenhardt | |
| 5,240,746 A | * | 8/1993 | O'Connell | 427/510 |
| 5,246,524 A | | 9/1993 | Kuroda et al. | |
| 5,411,588 A | * | 5/1995 | Diepens et al. | 118/666 |
| 5,502,310 A | * | 3/1996 | Niestrath et al. | 250/492.1 |
| 5,534,679 A | | 7/1996 | Beaver, II et al. | |

FOREIGN PATENT DOCUMENTS

| | | |
|---|---|---|
| DE | 39 17 895 | 12/1989 |
| DE | 39 35 992 | 10/1993 |
| DE | 196 06 683 | 8/1997 |
| DE | 298 13 977 | 1/1999 |
| DE | 298 16 588 | 2/1999 |
| EP | 0 501 551 | 9/1992 |

* cited by examiner

*Primary Examiner*—Kiet T. Nguyen
(74) *Attorney, Agent, or Firm*—Barry R. Lipsitz; Douglas M. McAllister

(57) ABSTRACT

In order for a unit for irradiating a workpiece with ultraviolet radiation, with at least one UV radiation source and at least one transporting device, it being possible by means of the transporting device for the workpiece to be fed from a charging location of the unit to an irradiating zone and to be transported from the latter to a removal location of the unit, to be developed in such a way that the unit can be operated more easily, it is proposed according to the invention that the unit has a common charging and removal location and the workpiece can be moved back and forth between the common charging and removal location and the irradiating zone.

11 Claims, 3 Drawing Sheets

UNIT FOR IRRADIATING A WORKPIECE WITH ULTRAVIOLET RADIATION

This application is a continuation of international application number PCT/EP00/13085 filed on Dec. 21, 2000.

The present disclosure relates to the subject matter disclosed in international application No. PCT/EP00/13085 of Dec. 21, 2000, which is incorporated herein by reference in its entirety and for all purposes.

BACKGROUND OF THE INVENTION

The invention relates to a unit for irradiating a workpiece with ultraviolet radiation, with at least one UV radiation source and at least one transporting device, it being possible by means of the transporting device for the workpiece to be fed from a charging location of the unit to an irradiating zone and to be transported from the latter to a removal location of the unit, the unit having a common charging and removal location and it being possible for the workpiece to be moved back and forth between the common charging and removal location and the irradiating zone.

Units for irradiating a workpiece with ultraviolet radiation are used, for example, in the production of interior components for motor vehicles. It is customary for them to be provided with a usually transparent layer of varnish or resin, to produce a glossy and hard-wearing surface. The layer of varnish can be applied in this case by the interior component to be coated, for example a wooden molded part, in particular a veneered part, being positioned against a wall of a molded part in such a way that a gap is formed between the wall and the surface to be coated of the interior component, which gap can subsequently be filled with liquid surface coating material which cures when exposed to ultraviolet radiation. The curing is then performed by the interior component being introduced into a unit for irradiating with ultraviolet radiation. The workpiece in the form of the interior component is then fed by means of a transporting device to an irradiating zone, i.e. the radiation field of a UV radiation source, where it is irradiated with the ultraviolet radiation. Subsequently, the workpiece is transported to a removal location of the irradiating unit, where it can be removed from the unit.

An endless transporting belt, which makes it possible for the workpiece to be transported in a straight line past one or more UV radiation sources, is usually used as the transporting device for the coating unit. Such a configuration has the advantage that a multiplicity of workpieces to be irradiated can be disposed one behind the other on the transporting belt and can be taken past the radiation sources, so that mass production can be accomplished.

However, a disadvantage of such a design is that usually a number of persons are required to operate a unit of this type.

EP-A-0 501 551 discloses a unit for the successive processing of workpieces, in which four carriers for receiving one workpiece in each case are disposed on a turntable. The turntable can be set in rotation, it being possible for the carriers, with the workpieces fixed on them, to be fed from a charging and removal location one after the other to three different workstations, in order subsequently to return to the charging and removal location. One of the workstations is formed as a UV irradiating zone. The irradiating of a workpiece by means of such a unit has been found to be time-consuming.

It is an object of the present invention to develop a unit of the type stated at the beginning in such a way that easier operation is made possible, it being possible for UV irradiation of a workpiece to be carried out within a shorter time.

SUMMARY OF THE INVENTION

This object is achieved according to the invention in the case of a unit of the generic type by the unit comprising at least two carriers for receiving one workpiece in each case, which carriers can be positioned on the transporting device and can be moved back and forth in an alternating manner between the charging and removal location and the irradiating zone.

Such a configuration has the advantage that the workpiece can be fed from the irradiating zone and, once irradiation has been performed, can be removed from the unit on the same side of the unit. The charging and removal of the workpiece can consequently be carried out by the same operator. This additionally has the advantage that the person who feeds the still unirradiated workpiece to the unit can himself check the result of the irradiation and, if need be, change the irradiating parameters of the unit for subsequent workpieces if the result of the irradiation is unsatisfactory. The operator can consequently be used not only for charging the unit and removing the workpieces but also additionally for checking the result of work and for setting the coating unit.

The configuration according to the invention also has the advantage that the unit can be formed very compactly as a single workstation. In mass production, a number of single workstations of this type can be used, so that, even if one workstation fails, overall production does not come to a standstill but instead further workpieces can be irradiated at other workstations without any interruption.

The carriers used according to the invention make it possible to align the workpiece in a defined position and feed it to the irradiating zone. For example, it may be provided that the workpiece can be securely clamped on the carrier.

To be able to irradiate as many workpieces as possible within a predetermined time, it is provided according to the invention that the unit comprises at least two carriers, which can be moved back and forth in an alternating manner between the charging and removal location and the irradiating zone. This makes it possible to dispose a first workpiece on a first carrier and then feed it to the irradiating zone. During the rradiation of this first workpiece, a second workpiece can be positioned on the second carrier and subsequently likewise be fed to the irradiating zone. Subsequently, the first workpiece can then be removed from the irradiating zone and replaced by a further workpiece.

It is particularly favorable if the carriers can be detachably connected to the transporting device. For example, it may be provided that the carriers can be screwed to or braced with the transporting device.

In the case of a preferred configuration, it is provided that the transporting device comprises at least one displaceably mounted transporting carriage. The transporting carriage may be configured, for example, in the manner of a drawer, which is displaceably held in a guide. It is of advantage here if the transporting carriage is displaceable between the charging and removal location on the one hand and the irradiating zone on the other hand.

It is particularly favorable if a number of carriers are mounted on the transporting carriage. This makes it possible to displace a number of carriers at the same time by the transporting carriage into a charging and removal position, so that a workpiece can be respectively disposed on the carriers. Subsequently, the transporting carriage is displaced into the irradiating zone, in which all the carriers disposed on the transporting carriage, with the workpieces secured on them, are exposed to the ultraviolet radiation. Once Irradiation has been performed, the transporting carriage can then be displaced back into its original position for the removal of the irradiated workpieces.

Alternatively or additionally, it may be provided that the transporting device comprises a rotatably mounted turning framework, for example a turntable. The workpieces to be irradiated can be positioned on the turning framework and subsequently transported in first instance into the irradiating zone and, once irradiation has been performed, back into the original position by turning of the turning framework.

It is of advantage here if on the turning framework there are mounted a number of carriers, which can preferably be fed by turning of the turning framework one after the other to the radiation field of a number of UV radiation sources. This permits continuous charging to and removal from the coating unit. For example, three UV radiation sources can be disposed on a common circumscribed circle, two radiation sources being disposed diametrically opposite each other and the third radiation source being positioned at an angular spacing of 90° between the two other radiation sources. The common charging and removal location of the unit can then be disposed diametrically opposite the third radiation source. This makes it possible to transport a workpiece successively to the individual radiation sources and subsequently back again to its original position by turning the turning framework through 90° in each case.

To protect the surroundings from ultraviolet radiation, it is of advantage if the unit comprises a covering. It can advantageously be provided here that the covering has an opening, via which the workpiece can be fed to the irradiating zone and can be removed from the unit. The opening may be provided, for example, laterally on the unit, so that the unit can be operated completely from this one side.

The coating unit can be made particularly easy to operate by making it possible for the workpieces to be fixed on the carrier and, after irradiation has been performed, removed from the carrier outside the covering and moved with the carrier through the opening. This makes it possible for the operator to secure the workpieces optimally on the carrier, without being hindered from doing so by the covering of the unit.

In the case of a particularly preferred configuration of the unit according to the invention, it is provided that the covering covers the turning framework and that the carriers are mounted displaceably on the turning framework and can be displaced through the opening. For charging the unit, it is then just necessary in each case for the turning framework to be positioned in such a way that a carrier is in line with the opening in the covering and consequently can be displaced through it.

As explained at the beginning, an irradiating unit of this type can be used in particular for the production of an internal component for motor vehicles. It is of advantage here if, for coating the workpiece and for curing the coating material by means of UV radiation, the at least one carrier comprises a molded part with a wall, against which the workpiece, that is for example the interior component, can be positioned in the region of a surface to be coated, thereby forming a gap, it being possible for the gap subsequently to be filled with liquid surface coating material which can be cured by means of UV radiation. This permits particularly cost-effective production of an interior component, for example, in that the carrier serves not only for fixing the workpiece on the transporting device, but additionally for processing the workpiece, for example its coating.

The following description of preferred embodiments of the invention serves together with the drawing for a more detailed explanation.

DETAILED DESCRIPTION OF THE INVENTION

Figure 1:
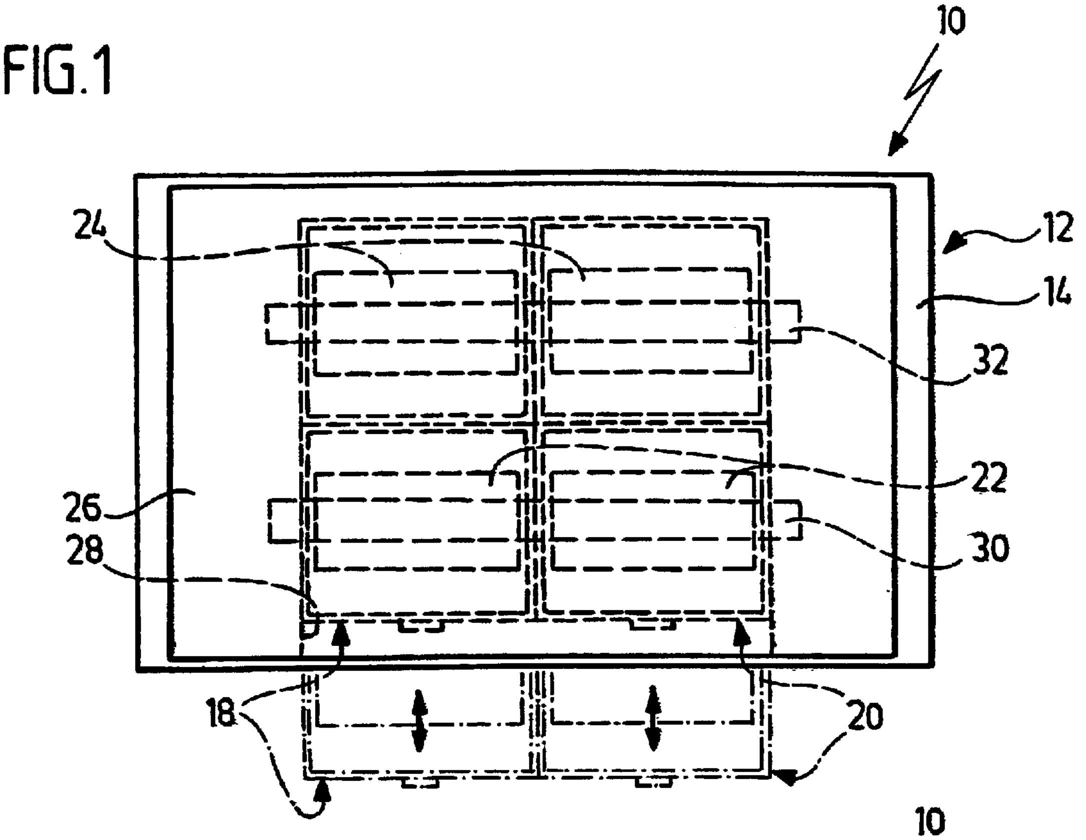
FIG. 1 shows a schematic plan view of a first embodiment of an irradiating unit.

In FIG. 1, a unit designated overall by the reference numeral 10 for irradiating a workpiece, in particular an interior component for motor vehicles, with ultraviolet radiation is represented. The unit 10 comprises a machine framework 12 with a work plate 14 and with supporting legs 16. Displaceably mounted on the work plate 14 are two transporting carriages 18, 20, which are configured in a drawer-like manner and on the upper side of which, facing away from the supporting legs 16, two workpiece carriers 22, 24 are respectively disposed.

The two transporting carriages 18, 20 are spanned by a covering 26, which completely covers the transporting carriages and workpiece carriers with the exception of a single access opening 28.

Mounted under the work plate 14 are two irradiating lamps 30, 32, which are aligned parallel to each other and are respectively surrounded on their underside, facing away from the work plate 14, by a reflector 34, so that they in each case emit ultraviolet radiation upward in the direction of the work plate 14. Both the work plate 14 and the transporting carriages 18 and 20 respectively have at the height of the irradiating lamps 30, 32 an aperture, so that the ultraviolet radiation can impinge from below on the workpiece carriers 22, 24 unhindered, provided that the transporting carriages 18 and 20 have assumed their pushed-in position, represented by dashed lines in FIG. 1. The irradiating lamps 30 and 32 consequently define with their radiation fields a common irradiating zone, to which the workpiece carriers 22 and 24 can be fed by displacing the transporting carriages 18 and 20. For charging the unit 10 with workpieces, the transporting carriages 18 and 20 can be drawn out FIG. 1 by dash-dotted lines. The transporting carriages 18, 20 can in this case be drawn out to the extent that both workpiece carriers 22 and 24 are accessible at the same time to an operator, so that the latter can respectively secure a workpiece to be irradiated on the workpiece carriers 22 and 24. Subsequently, the transporting carriages 18 and 20 can be pushed through the access opening 28 into the covering 26 to the extent that the workpiece carriers 22 and 24 reach the respective radiation field of the irradiating lamps 30, 32. After irradiation has been performed, the transporting carriages 18 and 20 are then withdrawn, so that the irradiated workpieces can be removed from the workpiece carriers 22, 24.

The charging of the two transporting carriages 18 and 20 can be performed in an alternating manner, so that, during the irradiation of the workpieces disposed on one transporting carriage, the other transporting carriage can be provided with workpieces or have them unloaded.

Figure 2:
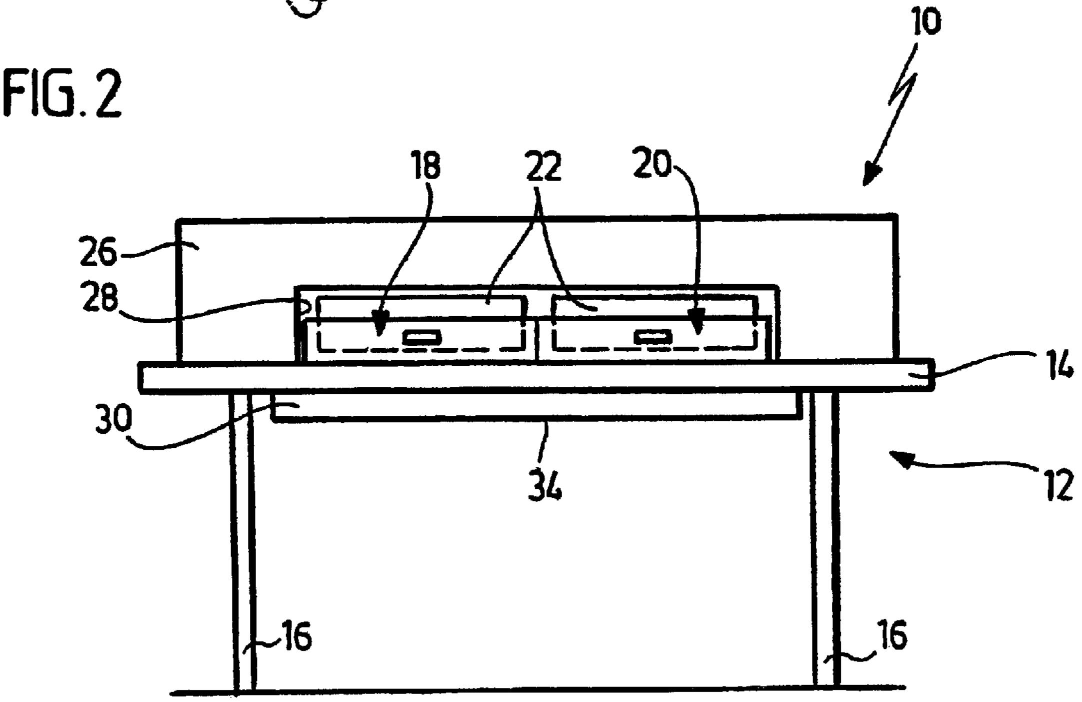
FIG. 2 shows a side view of the irradiating unit represented in FIG. 1.
Figure 3:
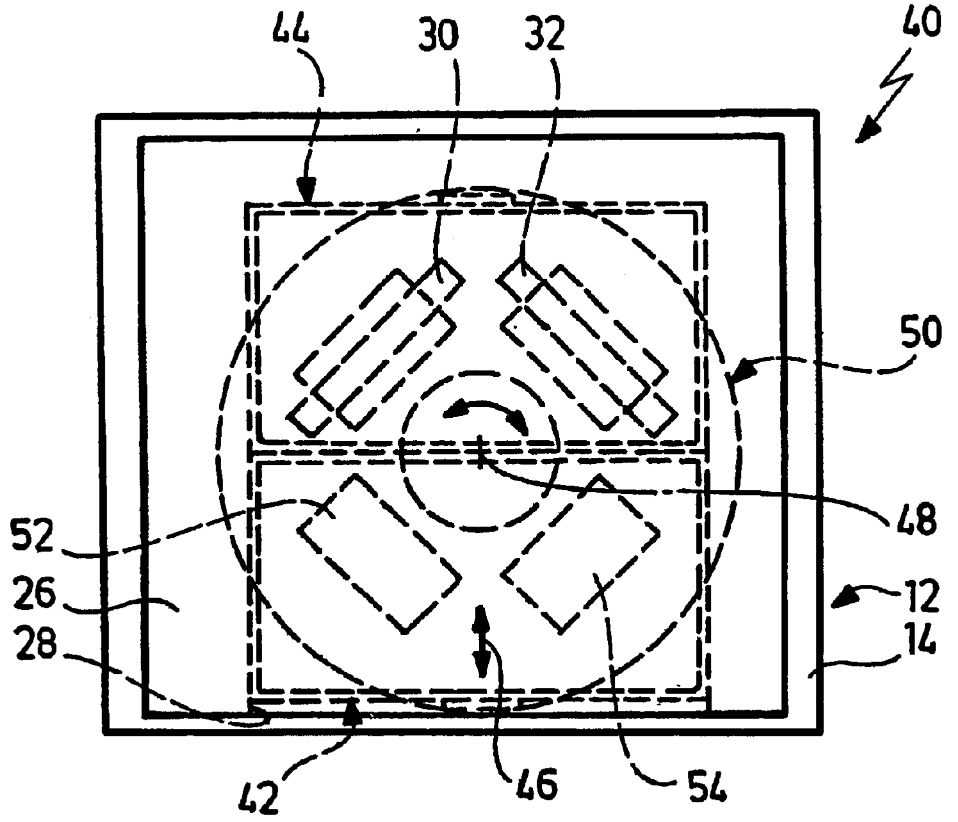
FIG. 3 shows a schematic plan view of a second embodiment of an irradiating unit.
Figure 4:
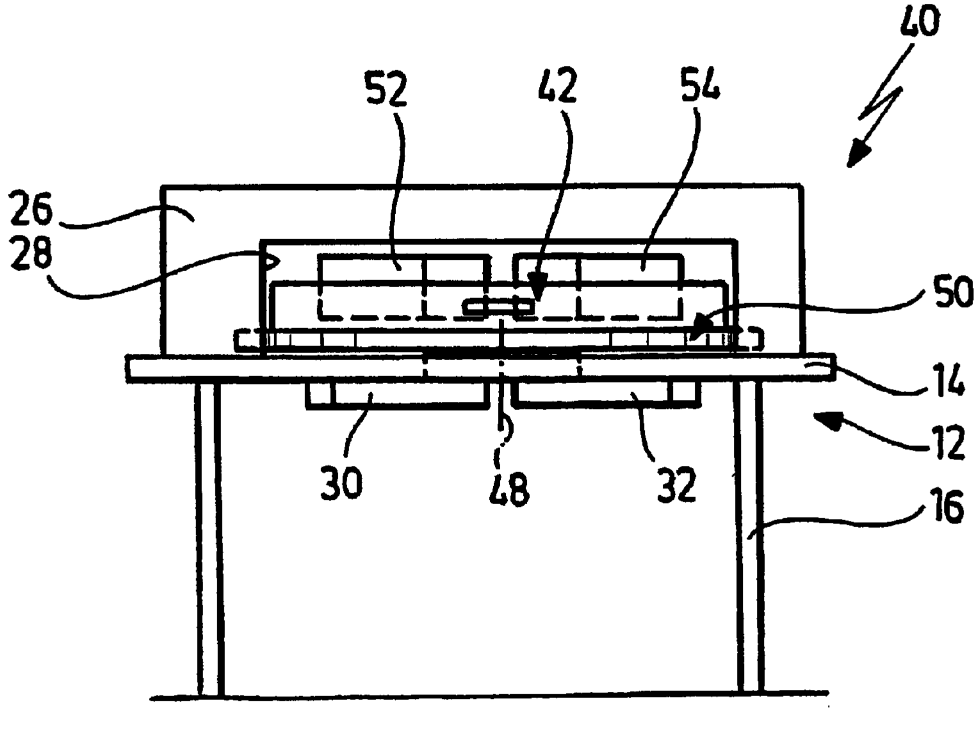
FIG. 4 shows a side view of the irradiating unit represented in FIG. 3.

In FIGS. 3 and 4, a second embodiment of a unit according to the invention for irradiating workpieces with ultraviolet radiation is represented. Like the third embodiment sketched in FIGS. 5 and 6, this is configured in a way similar to the unit according to FIGS. 1 and 2. Therefore, the same reference numerals as in FIGS. 1 and 2 are used for components which are identical or functionally the same.

The coating unit 40 represented in FIGS. 3 and 4 substantially differs from the unit 10 explained above by the provision of two transporting carriages 42 and 44, which are disposed one behind the other in the direction of displacement 46 on a turntable 50 mounted rotatably about a vertical axis of rotation 48 on the work plate 14. Disposed on each transporting carriage 42, 44 there are in each case two workpiece carriers 52, 54, aligned perpendicularly with respect to each other. By turning the turntable 50, one of the transporting carriages 42, 44 in each case can be arranged in line with the access opening 28 in the covering 26, so that the respective transporting carriage 42 or 44 can subsequently be drawn out, in order to provide access to the respective workpiece carriers 52 and 54. In this position, a workpiece to be irradiated can be respectively secured on the workpiece carriers 52 and 54. Subsequently, the respective transporting carriage 42 or 44 can be displaced through the access opening 28 into the interior of the covering 26, and the turntable 50 can subsequently be turned through 180°. In this inner position of the transporting carriages 42 and 44, the workpiece carriers 52 and 54 are respectively aligned with a radiation lamp 30, 32 positioned on the underside of the work plate 14, an aperture being provided in turn both on the transporting carriages 42, 44 and on the work plate 14 and additionally also on the turntable 50, so that the ultraviolet radiation leaving upward from the irradiating lamps 30, 32 can impinge unhindered on the workpiece carriers 52, 54 and the workpieces mounted on them.

The unit 40 represented in FIGS. 3 and 4 permits the simultaneous charging of two workpieces to be irradiated, while two further workpieces can at the same time be irradiated with ultraviolet radiation.

Figure 5:
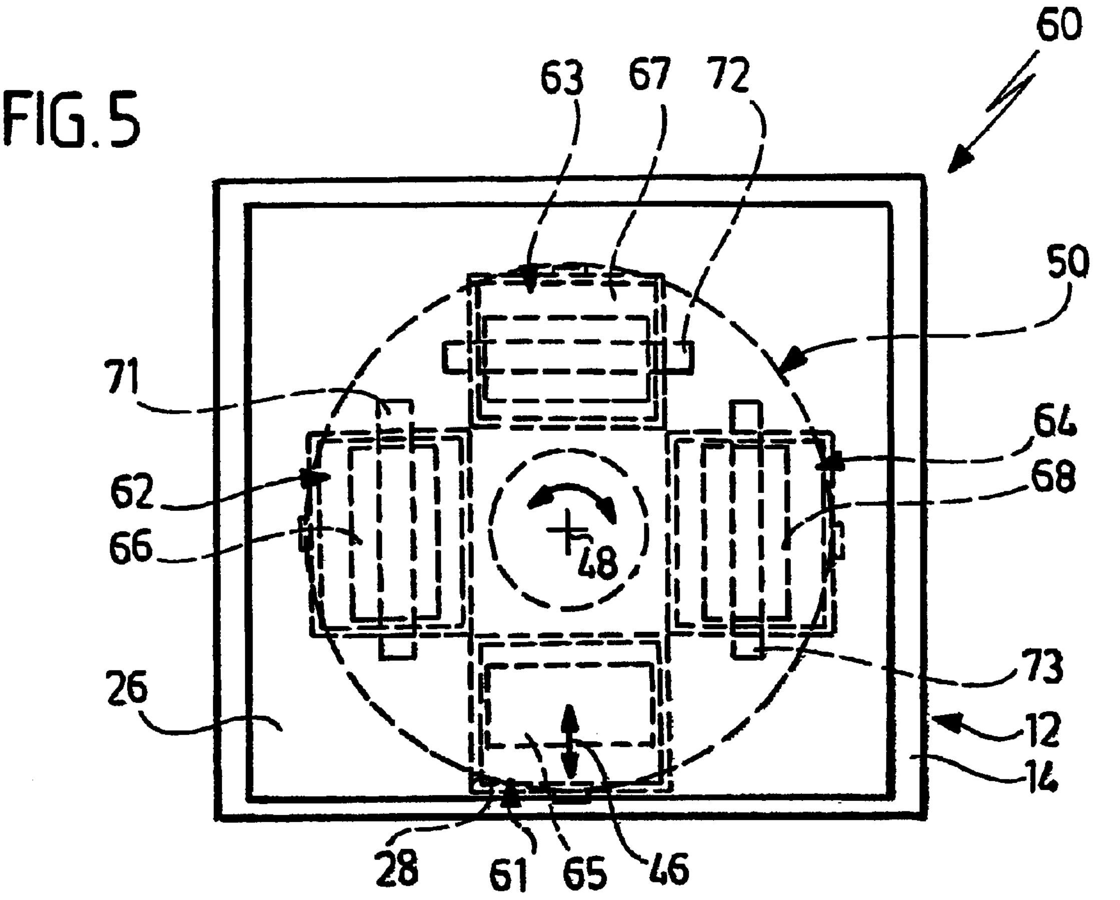
FIG. 5 shows a schematic plan view of a third embodiment of an irradiating unit and FIG. 6 shows a side view of the irradiating unit represented in FIG. 5.
Figure 6:
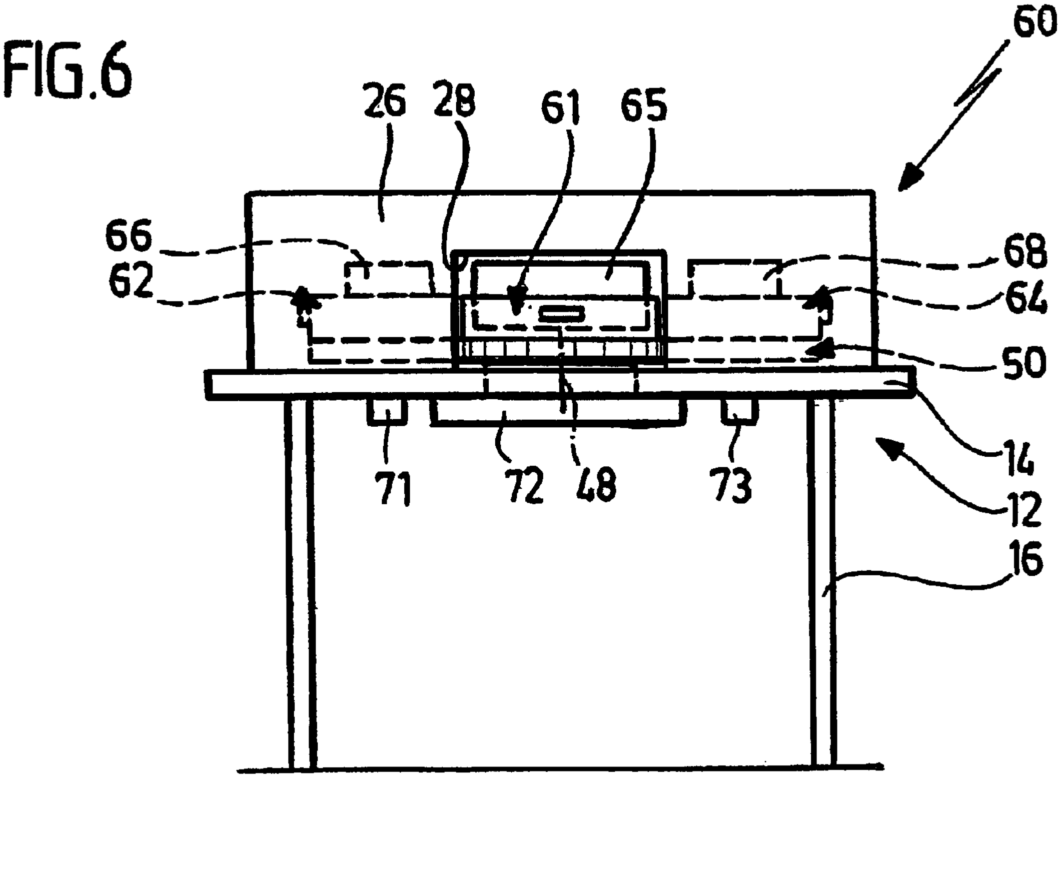

A further unit for irradiating workpieces with ultraviolet radiation is represented in FIGS. 5 and 6. In the case of this unit, designated in the drawing by the reference numeral 60, a turntable 50 is likewise used. In contrast to the unit explained above, a total of 4 transporting carriages 61 to 64 are displaceably mounted on the turntable 60, respectively offset with respect to one another by 90°. The transporting carriages 61 to 64 in each case carry a workpiece carrier 65, 66, 67 and 68, respectively, and can in each case be drawn out of the covering 26 through the access opening 28 in the covering 26 to the extent that the respective workpiece carrier is accessible to an operator for securing a workpiece.

Provided under the work plate 14 in the case of the unit 60 are a total of three Irradiating lamps 71, 72, 73, the irradiating lamps 71 and 73 being disposed diametrically opposite each other, while the irradiating lamp 72 is positioned diametrically opposite the access opening 28, between the irradiating lamps 71 and 73 respectively at an angular spacing of 90° from them. The work plate 14, the turntable 50 and the transporting carriages 61 to 64 in each case have in turn an aperture, so that the ultraviolet radiation emitted by the irradiating lamps 71, 72 and 73 can impinge unhindered on the respective workpiece carriers.

The unit represented in FIGS. 5 and 6 makes it possible that while a workpiece to be irradiated is being secured on one of the workpiece carriers 65 to 68, at the same time three workpieces secured on the remaining workpiece carriers can be irradiated with ultraviolet radiation.

In the case of all three irradiating units 10, 40 and 60 explained above, the workpiece carriers can be configured as a molded part for the coating of an Interior component for motor vehicles. For this purpose, the workpiece carriers can in each case have a wall, against which the interior component to be coated can be positioned in the region of its surface to be coated, thereby forming a gap. A liquid surface coating material can be filled into the gap when the transporting carriage has been drawn out of the covering 26, it being possible for said material to consist of a polyester material to which UV-radiation-sensitive sensitizers have additionally been added, so that the polyester material cures when the sensitizers are exposed to ultraviolet radiation. To secure the nterior components to the respective molded part, a clamping device may be additionally provided, so that the interior components can be braced with the molded part and the gap can be filled with the liquid surface coating material under a positive pressure of, for example, 0.3 to about 3.5, preferably 0.5 to 0.2, bar.

It is clear from the above that the unit according to the invention can be respectively configured as a single workstation, the operator who charges the irradiating unit with workpieces subsequently being able also to remove the irradiated workpieces from the unit, and consequently being able to assess the result of the irradiation. If need be, this operator can change the irradiating parameters, that is for example the duration of irradiation or the intensity of the ultraviolet radiation.

What is claimed is:

1. A unit for irradiating a workpiece with ultraviolet radiation, comprising:

at least one UV radiation source, at least one transporting device, the transporting device enabling the workpiece to be fed from a charging location of the unit to an irradiating zone and to be transported from the irradiating zone to a removal location of the unit, the unit having a common charging and removal location, and at least two carriers in each case for receiving a workpiece, which carriers can be positioned on the transporting device and which can be moved back and forth alternately between the common charging and removal location and the irradiating zone.

2. The unit as claimed in claim 1, wherein the carriers can be detachably connected to the transporting device.

3. The unit as claimed in claim 1, wherein the transporting device comprises at least one displaceably mounted transporting carriage.

4. The unit as claimed in claim 3, wherein the transporting carriage is displaceable between the charging and removal location and the irradiating zone.

5. The unit as claimed in claim 3, wherein a number of carriers are mounted on the transporting carriage.

6. The unit as claimed in claim 1, wherein the transporting device comprises a rotatably mounted turning framework.

7. The unit as claimed in claim 6, wherein a number of carriers are mounted on the turning framework, which carriers can be fed one after the other to radiation fields of a number of UV radiation sources.

8. The unit as claimed in claim 1, wherein the unit comprises a covering to protect the surroundings from ultraviolet radiation, the covering having an opening, via which the workpiece can be fed to the irradiating zone and can be removed from the unit.

9. The unit as claimed in claim 8, wherein the workpiece can be fixed on the carrier and removed from the carrier outside the covering and the workpiece can be moved with the carrier through the opening.

10. The unit as claimed in claim 9, wherein the covering covers the turning framework and in that the carriers are mounted displaceably on the turning framework and can be displaced through the opening.

11. The unit as claimed in claim 1, wherein each of the at least two carriers comprises a molded part with a wall, against which the workpiece can be positioned in the region of a surface of the workpiece to be coated, thereby forming a gap, the gap subsequently being filled with liquid surface coating material which can be cured by means of ultraviolet radiation.

* * * * *